No. 724,242. PATENTED MAR. 31, 1903.
W. BAKER, Sr.
BOX FASTENER.
APPLICATION FILED MAY 16, 1902.
NO MODEL.
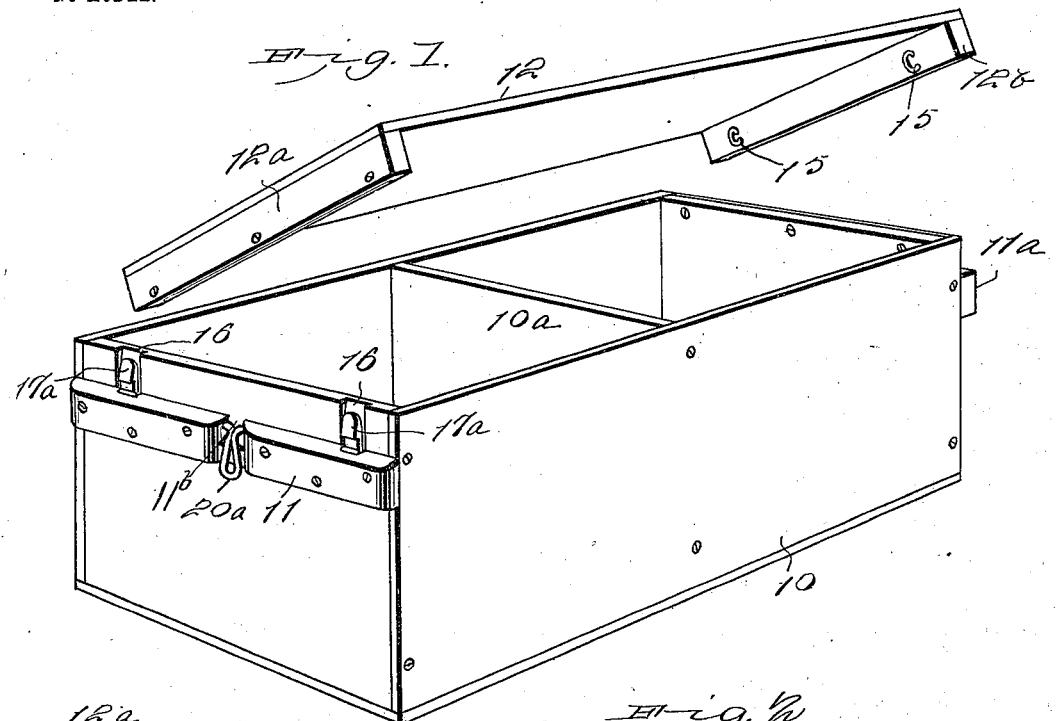
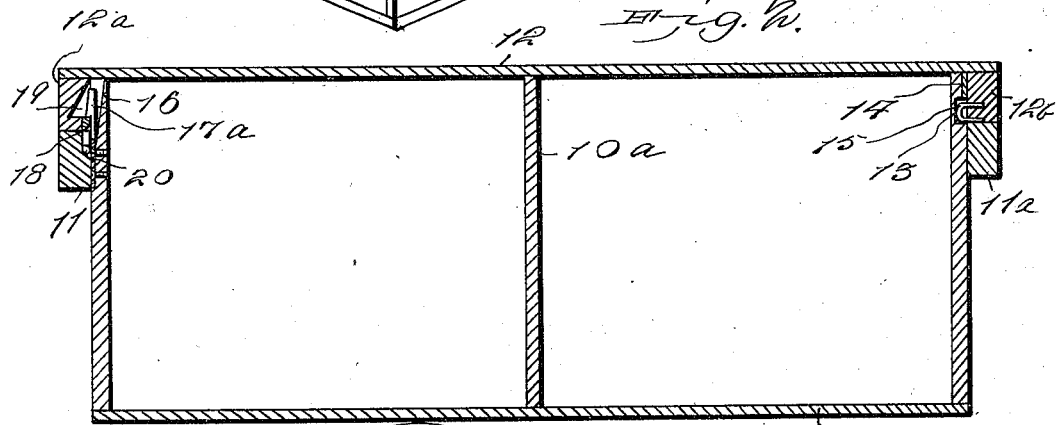
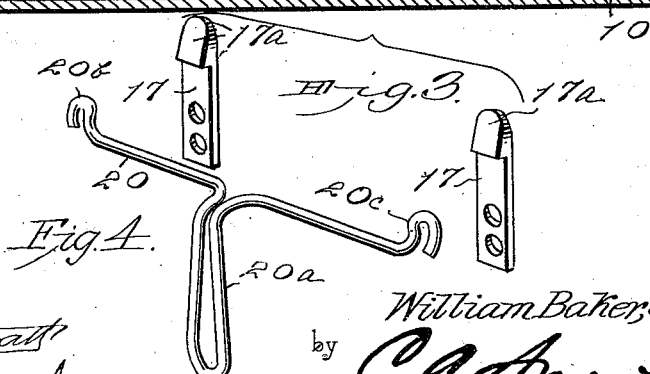
Witnesses
William Baker, Sr. Inventor
by C. A. Snow & Co.
Attorneys

UNITED STATES PATENT OFFICE.

WILLIAM BAKER, SR., OF CLAYSVILLE, KENTUCKY.

BOX-FASTENER.

SPECIFICATION forming part of Letters Patent No. 724,242, dated March 31, 1903.

Application filed May 16, 1902. Serial No. 107,667. (No model.)

*To all whom it may concern:*

Be it known that I, WILLIAM BAKER, Sr., a citizen of the United States, residing at Claysville, in the county of Harrison and State of Kentucky, have invented a new and useful Box-Fastener, of which the following is a specification.

This invention relates to box-lid fasteners; and it has for its object the attachment to the case and its cover of means whereby the cover may be automatically locked upon the casing and adapted to be readily unlocked and released when desired; and the invention consists in certain novel features of construction, as hereinafter shown and described, and specified in the claims.

The invention may be applied to any form or size of shipping-case or to a shipping-case employed for any purpose.

For the purpose of illustration in the drawings the invention is shown applied to an ordinary form of egg-shipping case, Figure 1 representing a perspective view of such casing with the cover shown elevated above the casing. Fig. 2 is a longitudinal section of the same with the cover locked upon the casing. Fig. 3 represents the spring-catches detached and disconnected. Fig. 4 is a perspective view of the trip-lever detached.

The casing is represented at 10 with the usual transverse division $10^a$ and cleats 11 $11^a$ transversely of the ends a short distance below the top edge of the casing. The cover is represented at 12, having cleats $12^a$ $12^b$ upon its ends engaging the cleats 11 $11^a$, as shown in Fig. 2.

The invention which is the subject of the present application consists in means whereby the cover 12 and its cleats $12^a$ $12^b$ may be detachably locked upon the casing, and this locking means is constructed as follows: The end of the casing containing the cleat $11^a$ is provided with spaced cavities, one of which is shown at 13 in Fig. 2; but it will be understood that any number of these cavities may be employed. Generally two will be sufficient, as indicated. Inserted into the body of the end of the casing above the cavities 13 is a metal bar 14, the lower edge of the bar forming the upper end of the cavities 13. The cleat $12^b$ is provided with inwardly-extending catches 15, preferably in the form of staples, as shown in Fig. 1, adapted to engage the cavities 13 beneath the bar 14, by which means the end of the cover 12 containing the bracket $12^b$ is retained detachably in position upon the casing. Formed in the opposite end of the casing or in the end supporting the bracket 11 are recesses 16, usually two and preferably in substantial horizontal alinement with the catches 15, and supported within these recesses are spring-catches consisting of spring-blades 17, having inclined heads $17^a$, the lower extremities of the heads projecting beyond the general surface of the end of the casing 10 and a short distance above the cleat 11, as shown in Fig. 1. The inner lower edge of the cleat $12^a$ is provided with a metal strip 18, and above this strip, in the interior surface of the cleat, are recesses, (indicated at 19 in Fig. 2,) the recesses registering with the spring-catches 17 and adapted to engage the heads $17^a$ of the spring-catches when the cover is closed down, as shown in Fig. 2. By this simple means the cover may be automatically connected to the casing by inserting the catches 15 into their respective recesses 13 and then forcing the other end of the cover downward and causing the recesses 19 to engage the barbed ends of the spring-catches by means of the metal strip 18. Some form of releasing mechanism must be provided whereby the spring-catches may be detached from the plate 18 when the cover is to be removed, and such releasing means is provided in the form of a transverse bar or rock-shaft 20, revolubly supported in a cavity in the inner surface of the cleat 11, and having an operating-handle $20^a$ centrally disposed thereon and with its ends upturned, as at $20^b$ $20^c$, and in engagement with the outer surfaces of the blades 17. The cleat 11 is provided with a central aperture $11^b$ to receive the handle $20^a$, as shown in Fig. 1. The bar 20 lies normally in the position indicated in Fig. 1, in engagement with the spring-blades 17, but not affecting them, but capable when the handle $20^a$ is moved outward to cause the ends $20^b$ $20^c$ to depress the spring-catches and release the cover, as will be readily understood. By this simple means a most effective and secure attaching and detaching means is provided for the cover, which may be applied readily to all forms of shipping-cases and which will securely protect the contents of the casing and prevent the cover from being shaken loose or accidentally displaced.

All of the parts may be cheaply constructed and applied to firmly secure the cover in place, while at the same time rendering it easily attachable and detachable when required.

The rock-shaft 20 with its ends $20^b$ $20^c$ and central handle $20^a$ will preferably be formed of a single rod bent into shape, as shown in Fig. 4, but may be otherwise constructed, if preferred.

The wear-plates 14 and 18 are important features of the construction, as they not only receive the impact of the catches 15 and 17, but also assist in supporting the casing and cover transversely and prevent any vertical strains to which they will be subjected from disintegrating the parts.

Having thus described my invention, what I claim is—

1. In a lid-fastening device, a pair of spring-catches secured upon a box, a rock-shaft journaled to said box, said rock-shaft having a downwardly-extending handle and upturned ends forming levers to engage said spring-catches, and a box-lid having a cleat provided with notches to engage said spring-catches, said notches being reinforced by a strip secured to the cleat below the lower edges of said notches.

2. A box having recesses in one end thereof near its upper edge, the reinforcing-strip secured above said recesses, cleats upon the ends of said box, a lid having cleats at the ends thereof, catch members upon the inner side of one of said cleats to engage the recesses in one end of the box, spring-catches mounted in recesses in the cleat at the opposite end of the box, a rock-shaft having upturned ends to engage said spring-catches, and reinforced notches in the catch-engaging cleat of the box-lid.

In testimony that I claim the foregoing as my own I have hereto affixed my signature in the presence of two witnesses.

WILLIAM BAKER, Sr.

Witnesses:
R. C. BATTE,
JAMES ASBURY.